United States Patent [19]

Whitener

[11] 4,390,150
[45] * Jun. 28, 1983

[54] TANDEM WING AIRPLANE

[75] Inventor: Philip C. Whitener, Seattle, Wash.

[73] Assignee: The Boeing Company, Seattle, Wash.

[ * ] Notice: The portion of the term of this patent subsequent to Jan. 14, 1989, has been disclaimed.

[21] Appl. No.: 6,698

[22] Filed: Jan. 26, 1979

Related U.S. Application Data

[63] Continuation of Ser. No. 648,706, Jan. 13, 1976, abandoned.

[51] Int. Cl.³ .............................................. B64B 3/00
[52] U.S. Cl. .................................. 244/45 R; 244/15; 244/13
[58] Field of Search ...................... 244/45 R, 45 A, 15, 244/13, 12.1, 191, 78; D12/76, 77

[56] References Cited

U.S. PATENT DOCUMENTS

| | | | |
|---|---|---|---|
| D. 234,079 | 1/1975 | Whitener | D12/77 |
| 1,492,262 | 4/1924 | Peyret | 244/45 R |
| 2,151,128 | 3/1939 | Looney | 244/45 R |
| 3,159,361 | 12/1964 | Weiland | 244/12.1 |
| 3,244,246 | 4/1966 | Welland | 244/12.1 X |
| 3,347,498 | 10/1967 | Priestley et al. | 244/191 |
| 3,358,946 | 12/1967 | Shye | 244/45 R |
| 3,438,306 | 4/1969 | Kazmarek | 244/78 X |
| 3,734,432 | 5/1973 | Low | 244/191 |
| 3,834,654 | 9/1974 | Miranda | 244/45 R |

FOREIGN PATENT DOCUMENTS

| | | |
|---|---|---|
| 593932 | 10/1947 | United Kingdom . |
| 1107011 | 3/1968 | United Kingdom ............. 244/45 A |
| 1230381 | 4/1971 | United Kingdom .................. 244/13 |

Primary Examiner—Galen L. Barefoot
Attorney, Agent, or Firm—Laurence A. Savage; Bernard A. Donahue

[57] ABSTRACT

A tandem wing aircraft having two wings of similar area wherein a lower first wing is located at the forward end of the fuselage attached directly to fuselage structure. A second higher wing is located at the aft end of the fuselage but is aerodynamically separated from the fuselage structure by strut structure. Pitch control is achieved by increasing or decreasing the lift on either wing; but downward acting load is not required. The two wings are preferably vertically separated by 25% to 50% of the span of the wings. Control redundancy for flight safety is achieved because of availability and location of control surfaces. Higher aspect ratio wings can be used because of inherently reduced bending moments on the wing; and overall aircraft gross weight is reduced due to structural and aerodynamic efficiency.

7 Claims, 13 Drawing Figures

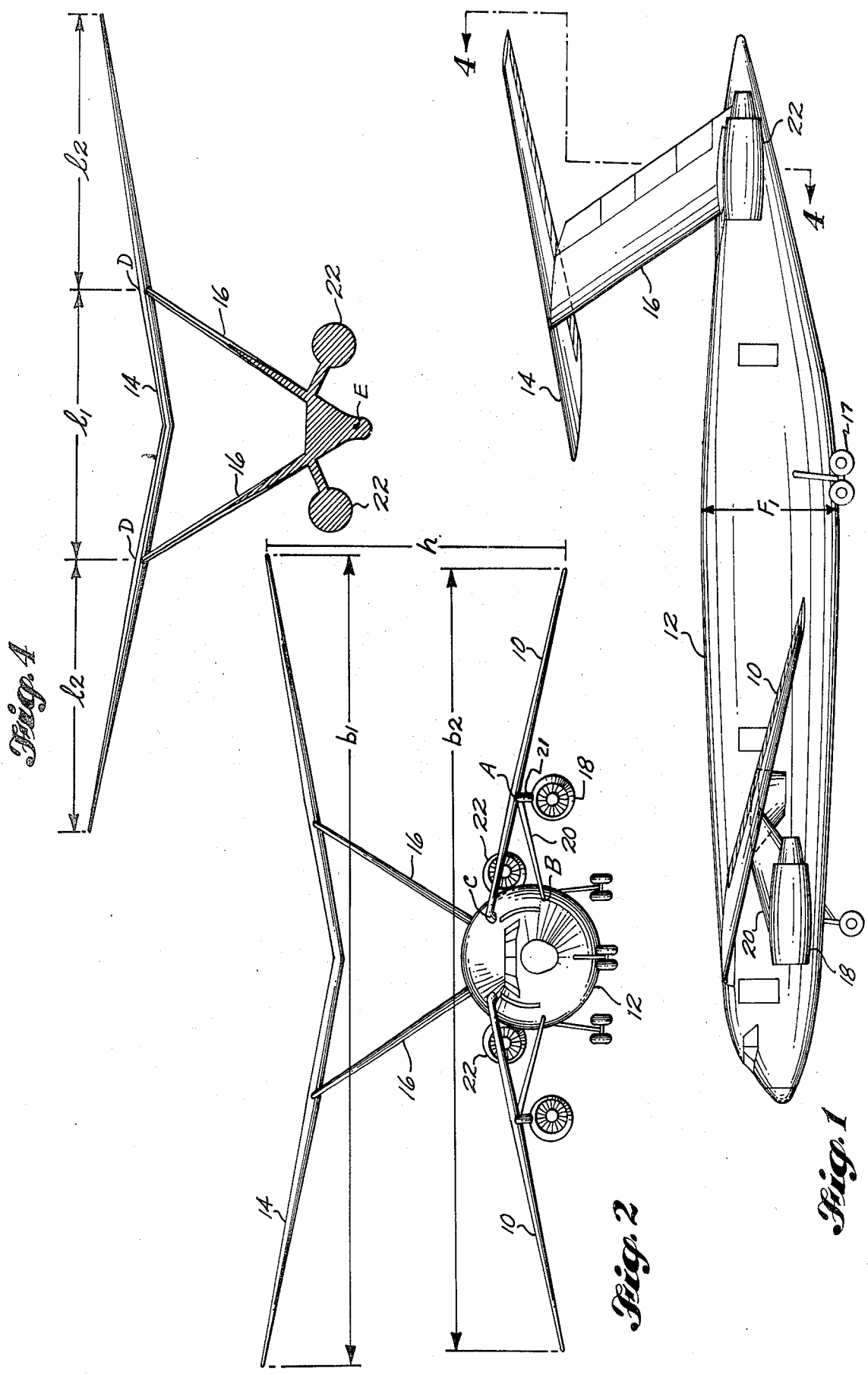

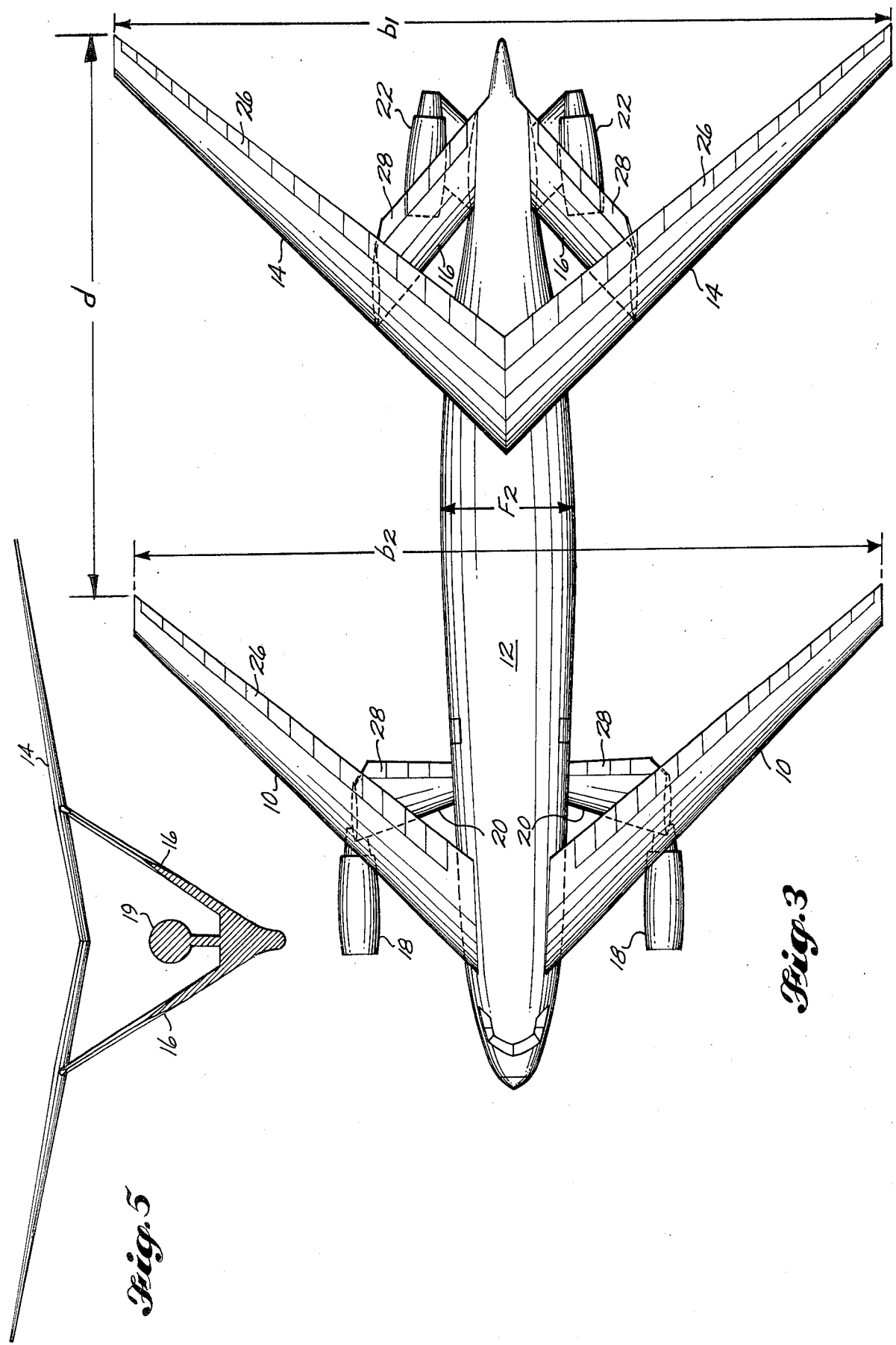

SINGLE WING AIRPLANE

SINGLE WING AIRPLANE

TANDEM WING AIRPLANE

This is a continuation of application Ser. No. 648,706 filed Jan. 13, 1976 now abandoned.

FIELD OF THE INVENTION

This invention relates to aircraft configuration design concepts; and, more particularly, to tandem wing aircraft having a lower first wing located near the forward end of the fuselage, and a higher second wing located at the aft end of the fuselage.

BACKGROUND OF THE INVENTION

Virtually all modern commercial jet aircraft in use today utilize a single wing extending laterally in both directions from a central portion of the fuselage. Such aircraft are designed and loaded so that the overall aircraft center of gravity will be located just forward of the aerodynamic center of lift of the wing; as required by stability considerations.

In flight the aircraft is balanced about the pitch axis by a balancing tail load, which normally acts downwardly. The balancing tail load is provided by a stabilizer, or horizontal tail surface, at the aft end of the fuselage. The stabilizer has small control surfaces called elevators to adjust the magnitude and direction of the tail load. The lift provided by the wing must be sufficient not only to lift the gross weight of the aircraft, but to compensate for any downward acting tail load. Accordingly, when such tail loads are high, as at takeoff, the allowable gross weight of an aircraft is significantly reduced. Moreover, drag loads are high on both the wing and tail surfaces.

In such conventional single wing aircraft, the fuselage structure is effectively two cantilever beams; one extending forward and the other aft of the wing. Maximum fuselage bending moments therefore occur near the wing in the central region of the fuselage. Furthermore, as will be more fully developed in the discussion which follows, because of "area-ruling" requirements, the fuselage structure of high speed aircraft must normally be reduced in diameter in this same central region of the fuselage. Such reduction in diameter of the fuselage is in widespread use today in supersonic aircraft design, and is known in the industry as "coke-bottling" of the fuselage. Not only are substantial structural weight penalties incurred by having the maximum loads at the minimum section, but in commercial passenger aircraft undesirable seat and aisle arrangements are required, and main landing gear stowage space is severely limited, sometimes requiring external fairing.

In such conventional single wing aircraft, the wing structure is effectively two cantilever beams; one beam extending in each direction laterally from the fuselage. Design bending moments increase rapidly from a minimum at the tip to a maximum at the root of each wing semi-span. In order to reduce drag, vertically thin and higher aspect ratio (wing span/effective average wing chord length) wings are desirable. However, such longer wings tend to create prohibitively high structural bending moments on the desired thin wing sections. Considerable research has been done in recent years on optimum wing cross-sectional shapes. "Supercritical airfoil" and "natural laminar flow" wing sections have been developed to reduce shockwave formation and promote laminar or non-turbulent flow over the section. Such wing shapes tend to have aerodynamic centers located farther aft on their sections (of the order of 40% chord as opposed to some 30% chord for a typical conventional section). This further aggrevates the balancing tail load problem previously discussed, requiring that still more downward acting tail load be made available.

Roll control in a conventional single wing aircraft is normally achieved by ailerons located in outboard regions of the wing. Lift control, as for takeoff and landing, is achieved by flaps extending from aft (and sometimes forward) portions of inboard regions of the wing. Spoilers extending upwardly from the wing are often used as speed brakes or to reduce lift. Accordingly, the wing, particularly its trailing edge, is crowded with primary and secondary control surfaces. The horizontal tail, with its elevator control surface, is normally dedicated exclusively to pitch control. The fin, or vertical tail, and its rudder are normally dedicated to yaw control.

Because of the complexity of modern aircraft, and the number of control surfaces, they are becoming increasingly difficult to fly manually. Accordingly, complex computerized "stability augmentation" and automatic pilot systems have been designed to automatically adjust control surfaces and reduce pilot work load. For safety reasons, it is extremely desirable that these computerized systems be redundant; i.e., that more than one, and preferably up to four, of such systems be completely independent, and each capable of achieving a desired maneuver for the aircraft. However, such multiple redundancy is extremely difficult, if not impossible, to attain in conventional single wing designs. The space available for the multitude of control surfaces required for such redundancy is inherently limited, and only one region of the aircraft is available in some cases to achieve the desired degree of control (e.g., stabilizer for pitch, and fin for yaw control).

Accordingly, it is a general objective of this invention to provide an aircraft configuration in which: (1) a downward acting balancing tail load is not required; (2) it is not necessary to reduce the fuselage diameter in its central region when area-ruling is required; (3) structural weight of the fuselage is reduced; (4) the wing structural weight is reduced; (5) higher aspect ratio wing sections may readily be utilized for reduced drag; (6) recently developed supercritical and natural laminar flow wing sections may be used; and (7) there is a plurality of flight control systems, each independently able to control the aircraft to provide redundancy for flight safety.

SUMMARY OF THE INVENTION

The foregoing and other objectives of this invention have been achieved in a tandem wing aircraft having a lower first wing located near the forward end of the fuselage and attached directly to fuselage structure. A higher second wing is located above the aft end of the fuselage and is aerodynamically separated from the fuselage structure by strut structure. Pitch control is achieved by increasing or decreasing the lift on either wing; but downward acting load is not required. The tips of the two wings are preferably vertically separated by at least 25% of the span of the forward wing and by at least 25% of the aft wing. The two wings normally are of similar, but not necessarily equal, span and area. Control redundancy is readily achieved because of availability and location of control surfaces on strut and wing structure. Higher aspect ratio wing shapes may be used because of inherently reduced bending moments on each wing.

BRIEF DESCRIPTION OF THE DRAWINGS

FIG. 1 is a side elevation view of one of the tandem wing aircraft embodiments of this invention.

FIG. 2 is a front elevation of the aircraft of FIG. 1.

FIG. 3 is a plan view of the aircraft of FIG. 1.

FIG. 4 is a rear view partly in section taken at 4—4 in FIG. 1.

FIG. 5 is a rear view similar to FIG. 4 showing an optional center engine placement.

DESCRIPTION OF THE PREFERRED EMBODIMENTS

Figure 6:
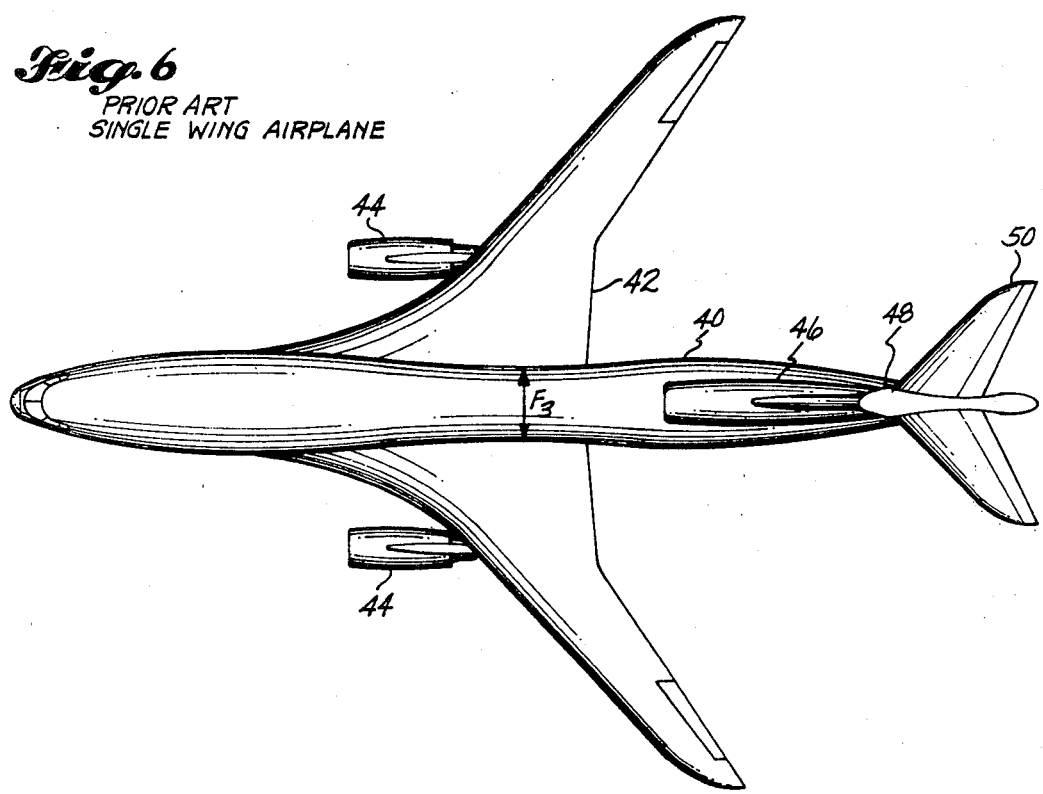
FIG. 6 is a plan view of a prior art single wing high speed airplane.

FIGS. 1–5 relate to a tandem wing aircraft embodiment of this invention, suitable for high speed transonic flight. A lower forward wing 10 is mounted at the forward end of fuselage 12. A higher aft wing 14 is aerodynamically separated from the aft end of fuselage 12 by aft wing struts 16. It will be noted that the struts 16 are of significant length; of the order of the height of the maximum fuselage section $F_1$. This is to assure aerodynamic separation of the wing from the fuselage. The wings are of approximately equal area. The fuselage is supported near each end, in the manner of simple beam, thereby significantly reducing fuselage bending loads over a comparable cantilevered fuselage in a single wing aircraft. As will readily be appreciated by persons skilled in this art, substantially structural weight savings in the fuselage are thereby achieved. As can be seen in FIGS. 1 and 3 the widest section of the fuselage ($F_1$ and $F_2$) is in its central region, where fuselage bending loads are highest, and where the main landing gear 17 may be conveniently stowed.

As is best seen in FIG. 2, forward propulsion engines 18 are mounted on the forward wing 10, and supported by forward wing struts 20 which connect to the engine struts 21 at point A just below the wing 10. Struts 20 are secured to fuselage 12 at point B. The wing 10 is mounted high on fuselage 12 at point C. The wing curvature near point C is for the purpose of reducing local interference drag between the wing and fuselage. For a similar reason point A is located just below, rather than on the wing centerline. This strut supported forward wing arrangement grossly reduces the design bending moments over those associated with the usual cantilever wing structure. Aft propulsion units 22 are strut mounted at the aft end of fuselage 12. As is best seen in FIG. 4, the aft wing struts 16 attach to aft wing 14 at points D in a central region, and preferably near the aerodynamic center, of each semi-span. The attachment at point D is preferably pin-connected to minimize feedback to bending loads into the strut structure. In this manner the entire wing is supported as a continuous beam over two supports D, with a central span of length $l_1$, and a free, or cantilevered, span of length $l_2$. This structural arrangement significantly reduces design bending moments on the aft wing, over those associated with the usual cantilever wing. In the embodiment shown each of the three spans are of approximately equal length. To keep the wing bending loads down, it is preferable to have a center span by which is at least of the order of 20% of the wing span $b_1$. Further, the combined triangular wing and strut system between points D (on the left), E, and D (on the right) advantageously react the wing loadings into the fuselage in the manner of a truss system with a minimum of secondary or local bending problems. It should also be noted that in this embodiment the aft wing struts 16 extend horizontally as do the forward wing struts 20. Therefore, the drag penalties for the struts may be offset in some measure by beneficial lift effects.

As is best seen in FIG. 3, the span $b_1$ of the aft wing 14 and the span $b_2$ of forward wing 10 are substantially the same length; $b_1$ being slightly longer in this embodiment. As is well-known to persons skilled in this art, the aspect ratio of a wing is, in general terms, the span divided by the average chord length. Aspect ratio is computed as $A.R. = (b^2/S)$ where b is span, and S is the total wing area. High aspect ratios are desired to minimize drag. In a single wing aircraft, achieving higher aspect ratio by reducing average chord length and increasing span is likely to cause prohibitively high bending moments. In the tandem wing aircraft of this invention, the two wings share the lifting loads, and therefore each inherently has roughly twice the aspect ratio of a single wing of the same span. Moreover, as previously noted, the wing strut supports of the embodiments of FIGS. 1–5 further reduce design bending moments. The aspect ratio of the wings shown in FIGS. 1–5 is of the order of 10.0, which is generally considered very difficult from a structural point of view to obtain in a single wing aircraft for a similar mission.

FIG. 5 shows an optional center engine placement at the aft end of the fuselage, between the struts 16. In this location a single aft propulsion unit 19 may be used. Alternatively, it may be added to propulsion units 16 to provide increased power; in which case the relative size of wings 10 and 14 could be adjusted to provide the desired center of gravity range. However, it will be apparent that this tandem wing aircraft is not unduly sensitive to center of gravity location, as are many conventional single wing aircraft.

Biplane aircraft have been known since the earliest days of aviation. These aircraft usually included two or more wings vertically spaced apart but longitudinally aligned with offered certain structural, and other, advantages over single wing configurations. However, the induced drag caused by interaction of the airflows of the two wings was relatively high, and therefore the industry turned to a single wing aircraft as soon as these problems were resolved. The location of the two wings of the tandem wing aircraft of this invention is such that the induced drag due to interaction of the flows around the wing is minimized. The total induced drag of the aircraft is in a range generally considered acceptable for single wing aircraft.

As is best seen in FIG. 2, the wing 10 is spaced apart from wing 14 by a distance h measured between wing tips. In swept-back wings of the type shown in FIG. 2 significant wing tip vortices are generated. It is contemplated that state-of-the-art devices may be incorporated to reduce such wing tip vortices. However, the most pertinent wing spacing parameter for induced drag is believed to be wing tip spacing, rather than an average spacing of the two wings, primarily because of such vortices. In the embodiment shown in FIGS. 1-5 the ratio of h to either $b_1$ or $b_2$ is preferably within the range of about 0.30 to 0.45. For most other embodiments of this invention h/b will range from about 0.25 to 0.50 when measured against either wing span; this considering the trade-off effects of reducing induced drag by increasing the wing spacing, h, against an increase in parasite and other drag caused by lengthening the aft wing struts. In certain wing tunnel model testing conducted to date, a parameter $b_{ref} = \sqrt{b_1^2 + b_2^2}$ has been used in computing wing spacing relationships. Such $h/b_{ref}$ values are of course significantly less than those for either $h/b_1$ or $h/b_2$, although describing the same aircraft.

It is contemplated at the present time that the wings of the aircraft be separated longitudinally along the aircraft fuselage as far as possible to reduce their interaction; this taking into account the many other unrelated factors in design of an overall aricraft. In FIG. 3 the distance d longitudinally between wing tips can be seen to be of the order of 50% of the overall length of the fuselage, and it is presently considered that most of the embodiments of the invention will have similar longitudinal wing spacings; i.e., of the order of at least 40% of the fuselage length.

It is also contemplated at this time that the total lift be distributed as closely as possible between the two wings. Certain emperical induced drag estimates have indicated best performance with equal lift distribution. However, many other factors such as payload, fuel, and engine arrangement must be taken into account and the lift distribution between wings adjusted accordingly. The embodiments considered to date have had a lift distribution ranging from 40% to 60% of total lift for either wing. Wing lifting areas will of course generally correspond to this same range. Because of the inherent advantages previously discussed, only wing aspect ratios exceeding eight have been considered to date. In FIG. 3 twenty-four control surfaces 26 are shown to be available on each wing. It is contemplated that at least twelve such control surfaces be provided for most embodiments of this invention. The outer span control surfaces 26 may advantageously be used as low speed ailerons; midspan control surfaces 26 as high speed ailerons and flaps; and inner-span control surfaces as elevators and flaps, as will readily be understood by persons skilled in this art. The wing struts 16 and 20 may each be provided with a plurality of individual rudder control surfaces 28. Four separate surfaces 28 on each of the four struts, as shown in FIG. 3, provide multiple options with modern control systems. The control surfaces 26 and 28 are preferably individually actuated and positioned by a computerized flight control system.

This invention contemplates the use of a plurality of and preferably four individual control systems each independently capable of maneuvering the aircraft. Since each wing is a lifting surface, a downward acting control load, such as the balancing tail load of conventional aircraft, is not required. Therefore, takeoff gross weight is not penalized by balancing tail load. Rapid and balanced vertical translation without pitch, either upwardly or downwardly, may be achieved by increasing or decreasing lift on both wings simultaneously. Independent pitch and roll control can be achieved by the control surfaces on either of the two wings. Yaw control can be achieved by any number of combinations of individual strut control surfaces 28, which function as rudder surfaces.

Furthermore, it is contemplated that such control systems may be computer operated to tailor and limit the structural loads applied to each wing. For example, the positions of each of the individual control surfaces 26 may be set to optimize the span lift distribution. In the embodiment of FIGS. 1-5, the wings are swept back substantially. Such wings inherently tend to off-load at their outer spans under high loading, thereby reducing the maximum structural loads. The elasticity of the center span of such wings can be designed to increase load under such high loading conditions. This can be accomplished by adjusting center span sweep and stiffness to further contribute to off-loading of the outer spans. However, even these reduced loads can be further significantly reduced by control of lift distribution. In straight wing embodiments of this invention the advantage afforded by such computerized lift distribution is even more significant.

FIG. 6 is a prior art, or more properly a state-of-the-art design for a generally conventional single wing high speed jet aircraft, equipped with a fuselage 40 having a reduced section $F_3$ in its central portion where wings 42 are attached. The forward engines 44, aft engine 46, fin 48 and stabilizer 50 are of generally conventional design.

Figure 7:
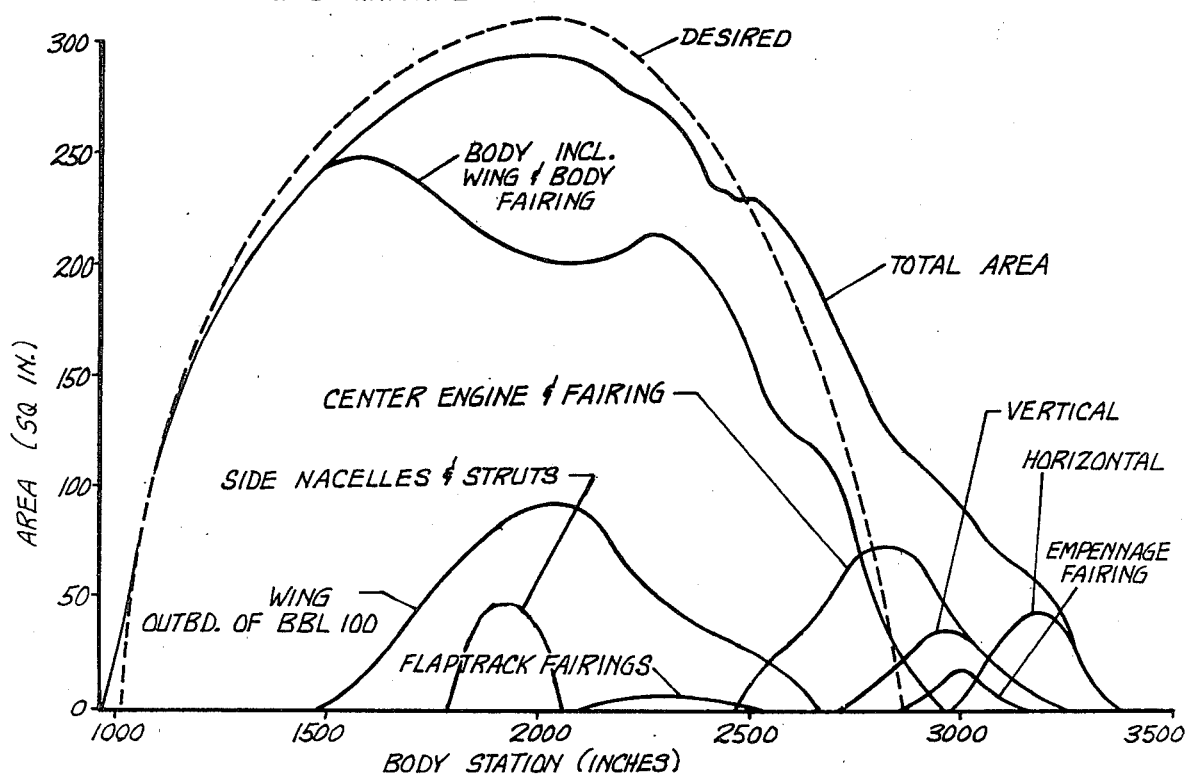
FIG. 7 is an area-ruling diagram for the aircraft of FIG. 6.

The requirement for reduced section $F_3$ becomes apparent from an examination of FIG. 7, which is an area-ruling diagram for an aircraft of the type shown in FIG. 6. It is now well-known that good aerodynamic efficiency requires that a high speed airplane be "area-ruled". This means that the transverse cross-sectional area of the entire airplane should vary along the longitudinal length of the airplane in a certain predetermined manner; conforming as closely as possible to quantities defined by a specific plotted curve of area vs. length along the aircraft. The curve shape is approximately parabolic and is known in the industry as a Sears-Haack curve. See for example, "Missile Aerodynamics" by Jack N. Neilson, McGraw-Hill Book Company, Inc., 1960, page 284.

In FIG. 7 the dotted line is a desired approximation to a Sears-Haack curve. Note that the solid line plot representing wing area (labeled "Wing") rises rapidly in the region of Body Station 2000. Accordingly, in order to prevent the total area plot from greatly exceeding the desired dotted line in this region, there must be a corresponding reduction in fuselage area, as shown by the curve labeled "Body". If the fuselage cross-section at $F_3$ is made larger to ease the space and structural problems previously discussed, the aircraft length must also be increased. This is required to stay within reasonable fineness ratio (length to effective diameter) limits to keep cruise drag within acceptable limits. The extra length results in more fuselage weight, increased wing area for lift, and increased wing weight. Accordingly, increasing the size of the critical small section creates very substantial weight and performance penalties. It will also be noted in FIG. 7, that on this particular aircraft configuration, the rear engine, vertical and horizontal tail surfaces combine to depart substantially from the desired shape.

Figure 8:
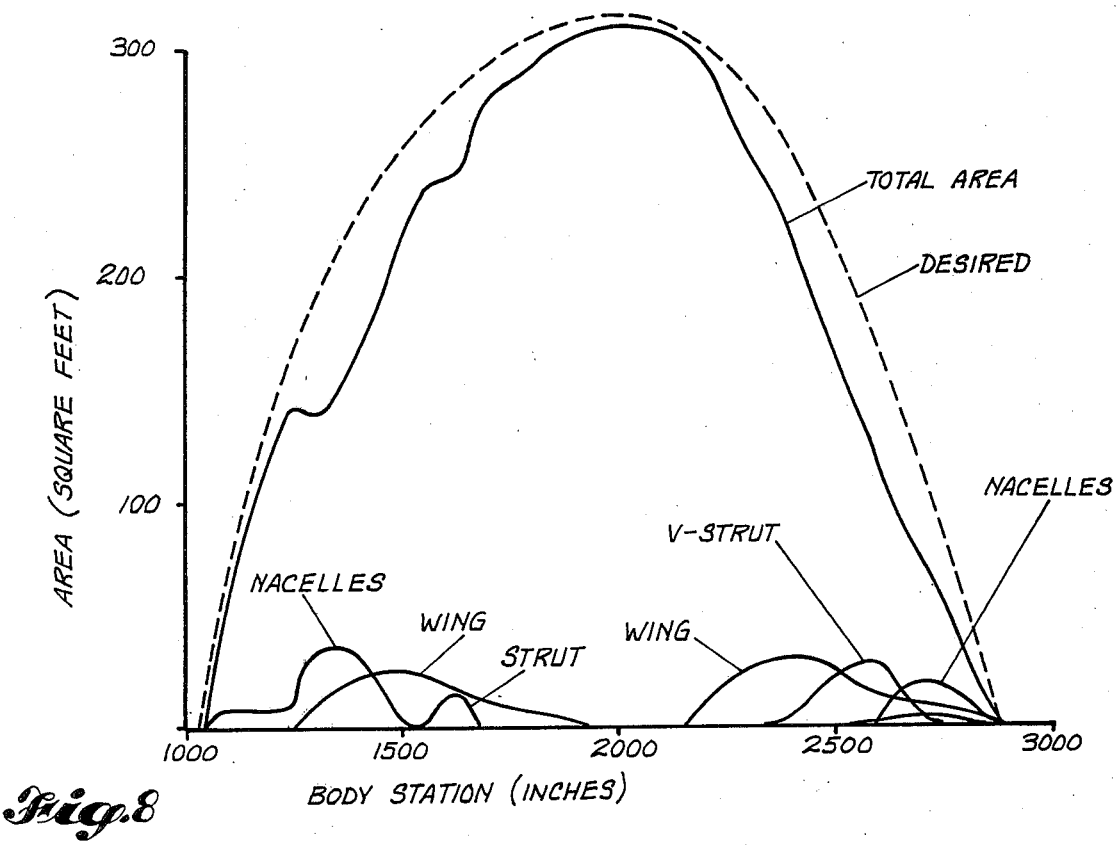
FIG. 8 is an area-ruling diagram for the aircraft of FIGS. 1—5.

FIG. 8 is an area ruling diagram for a tandem wing aircraft of the type shown in FIGS. 1-5. Note that in the region of Body Station 2000 minimal wing area is plotted. Accordingly, and consistent with area-rule principles, the effective fuselage diameter may be maximum where bending loads are high, and the wide section is well adapted for landing gear stowage and passenger accommodation standpoint, allowing for the same number of passengers in a shorter fuselage; again providing compound benefits in terms of reduced size, weight, drag and power. Significant drag reduction is attributable to the smaller allowable frontal area of the fuselage. In a single wing design, it may be necessary to increase the near frontal area of the fuselage in order to comply with area ruling principles and achieve reduced drag at high speeds. If this is done, of course, there will be significant low-speed drag and structural weight penalties. An example of the use of this expedient is the enlargement or "hump" on the forward top part of the Boeing 747 fuselage.

Comparing the single wing aircraft of FIG. 6 with the tandem wing aircraft of FIGS. 1-5, typical design values might be as follows:

| PARAMETER | TANDEM WING | | SINGLE WING | |
|---|---|---|---|---|
| | Fwd Wing | Aft Wing | Wing | Stabilizer |
| Area-$ft^2$ | 1300 | 1344 | 2572 | 552 |
| Span-ft | 112 | 116 | 133 | 42 |
| Root Chord-in | 206 | 204.7 | 340 | 225 |
| Tip Chord-in | 72.8 | 73.3 | 126 | 90 |
| M.A.C.-in | 150 | 147 | 249 | 167 |
| Taper Ratio | .353 | .357 | .371 | .4 |
| Aspect Ratio | 9.62 | 10.0 | 6.8 | 3.2 |
| Sweep ($\frac{1}{4}$ chord) | 42.5° | 42.5° | 42.2 | 42.5 |
| Dihedral | −13° | +10° | +7° | 0 |
| Incidence | 3° | 3° | 0 | — |

The above data are for two particular preliminary designs for high speed passenger aircraft which have recently been proposed, and are included for purposes of illustration only. No representation of any kind is made that the single wing parameters cannot be improved beyond those shown; or that practical considerations, such as manufacturing costs, will not alter the data of either design. Each proposed aircraft is designed to accommodate about 200 passengers. The fuselage length of the tandem design is 155 feet, that of the single wing design some 170 feet. Maximum fuselage diameter of the tandem design is 239 inches in the central region of the fuselage (see $F_1$ and $F_2$ in FIGS. 1 and 3). Maximum fuselage diameter in the single wing design is 218 inches with a maximum at the central reduced section $F_3$ (FIG. 6) of some 157 inches.

It can be seen from the data tabulated above, that the total horizontal "lifting" surface area is 3124 $ft^2$ for the single wing version (wing and stabilizer), but only 2644 $ft^2$ for the tandem wing aircraft (both wings). The enclosed volume of both wing and fuselage structure is significantly less in the tandem wing embodiment. Since it is well-known that the weight of structure required to enclose a volume generally increases geometrically with increase in volume, substantial structural weight savings are involved. Furthermore, the theoretical weight advantages for the tandem wing embodiment therefore increases as larger aircraft are considered. The overall weight advantages are compounded; particularly with respect to the wings, since reduced weight allows for reduction in total lifting surface area.

Figure 9:
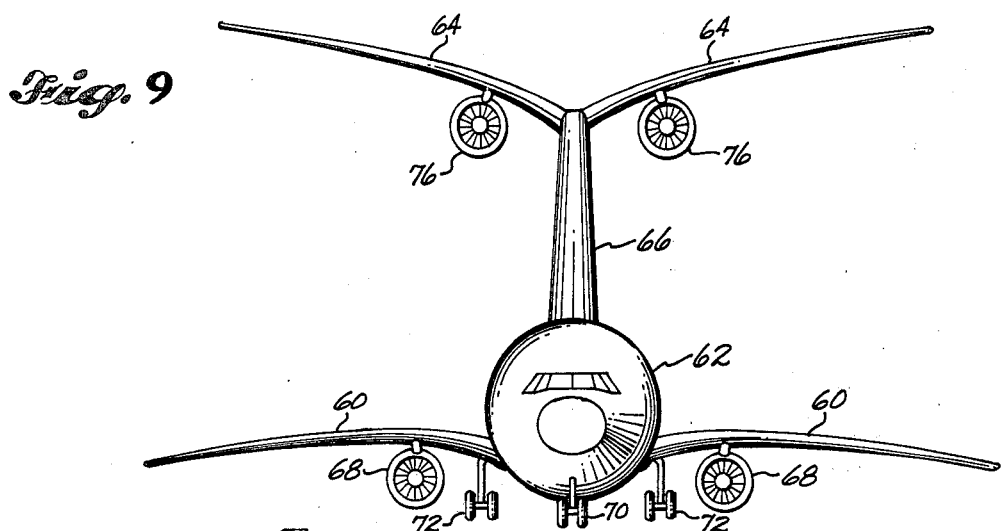
FIGS. 9 and 9A are front elevation and plan views of another embodiment of the tandem wing aircraft of this invention.
Figure 9A:
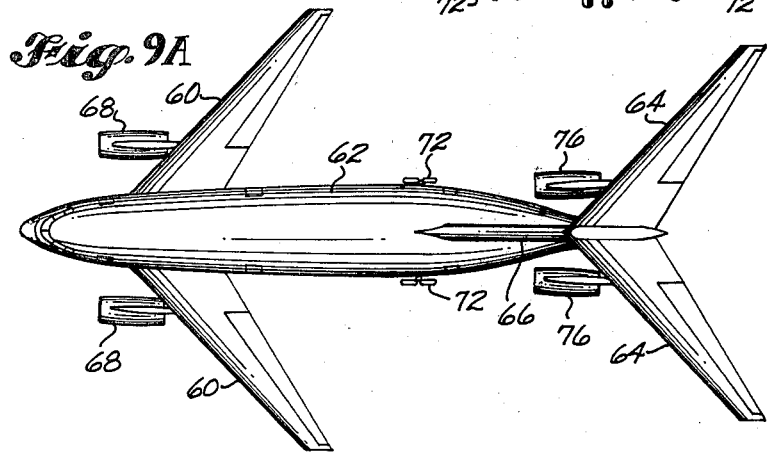

FIGS. 9 and 9A illustrate an optional area-ruled embodiment of the tandem wing aircraft of this invention wherein forward wing 60 is attached to the lower region of fuselage 62. The aft wing 64 is aerodynamically separated from the fuselage by a single large strut 66. As in the previous embodiment discussed, a conventional forward engine 68 and nose wheel 70 is used. However, the forward wing is not strut-mounted. The main landing gear 72 is attached in the central region of the fuselage where the diameter is largest. The aft wing is provided with a pair of engines 76. Neither of the wings of this configuration are strut-mounted. Accordingly, some of the wing structural weight and yaw control advantages discussed in connection with the previous embodiment are lacking.

Figure 10:
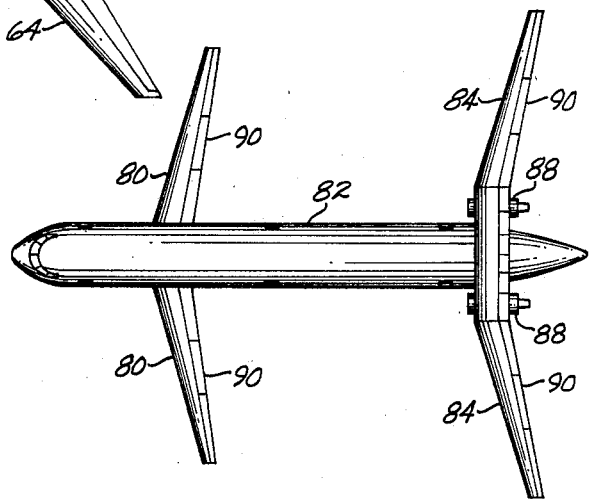
FIG. 10 is a plan view of yet another embodiment of the tandem wing aircraft of this invention.
Figure 11:
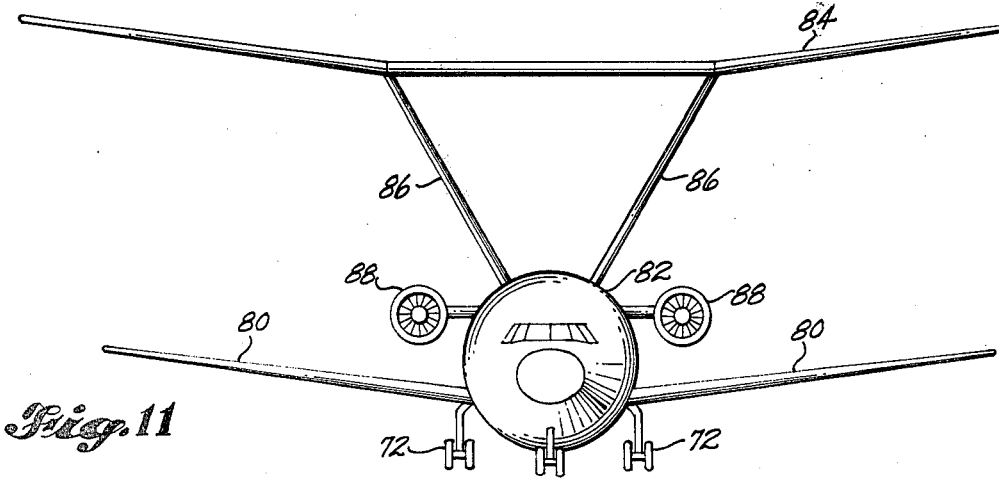
FIG. 11 is a front elevation view of the aircraft of FIG. 10.

FIGS. 10 and 11 show an optional embodiment wherein relatively straight (non-swept) laminar flow wings are employed, and the fuselage has not been fattened in its central region for maximum benefit under area ruling principles. Forward wing 80 is attached in a lower region of the fuselage 82, and the aft wing 84 is attached by V-strut members 86 similar to those of the embodiment of FIGS. 1-5. The two engines 88 are located at, and attached to, the aft end of the fuselage. Note that the span of the forward wing is of the order of 80% of that of the aft wing for this particular configuration.

Figure 12:
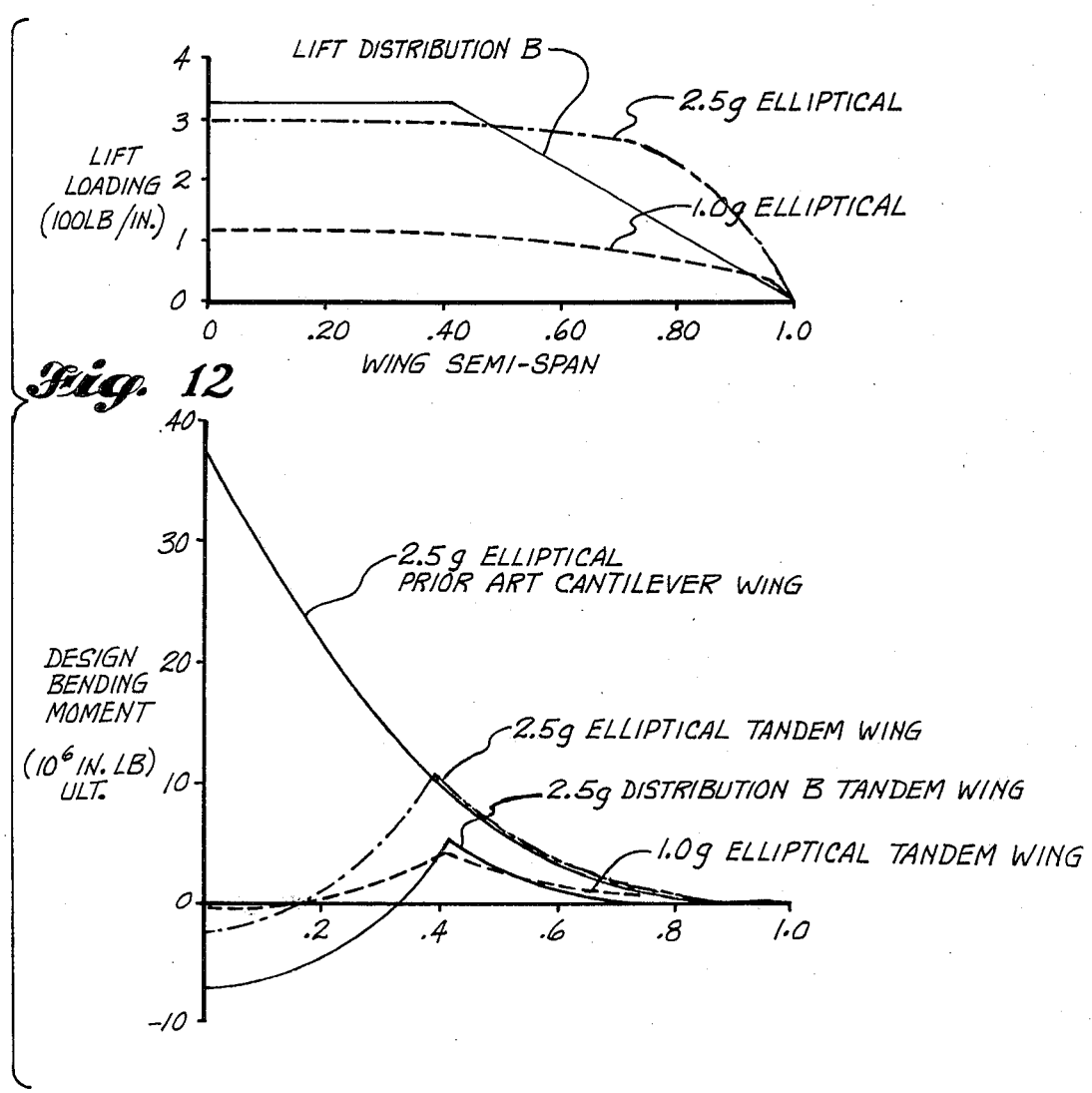
FIG. 12 is a schematic diagram of wing semi-span loading and bending moments illustrating the reduction in design bending moments obtainable with the aircraft of this invention.

FIG. 12 shows certain lift load and design bending moment distributions over a typical wing semi-span, for both a conventional cantilever wing and the two-support continuous beam type wings in the preferred embodiments of this invention. The dotted line plots in the upper loading diagram show typical lift loadings for 1.0 g cruise, and 2.5 g maneuver conditions. The solid line plot labeled "Lift Distribution B" is representative of the type of loading readily available with the tandem wing aircraft when a computer controlled actuation means for tailoring load distribution is used. In the lower design bending moment plot of FIG. 12 it can be seen from the upper solid line curve that the 2.5 g elliptical moments on a prior art cantilever wing rise rapidly and continuously to a maximum at the wing root. The dotted line plots labeled 1.0 g and 2.5 g elliptical are typical of what can be expected with the two-support continuous beam wing concepts of the tandem wing airplane. The 2.5 g tandem wing plot shows the same values as the cantilever wing plot until the first support or strut is reached at about 0.40 span. As will readily be understood by persons skilled in this art, the moment is then reduced over the remaining innerspan by the amount proportional to the strut reaction. In this manner the design bending loads for the continuous beam wing are grossly reduced over those for the cantilever wing. A further reduction obtainable with the computer controlled "Load Distribution B". Note that the Distribution B curve shows only slightly higher bending moments than the 1.0 g design condition. Since the 1.0 g condition exists during cruise, while 2.5 g exists only during an extreme maneuver, it will be apparent that a near optimum reduction in design loads can be achieved. It sould be noted that these diagrams are included for purposes of illustration only and no representation whatsoever is made concerning the absolute values shown.

Many variations in the preferred embodiments shown will occur to persons skilled in this art. For example, in applying the disclosed principles to supersonic tandem wing aircraft having high supersonic speeds lower aspect ratio wings may be required. Accordingly, this invention should be considered limited only by the scope of the following appended claims.

I claim:

1. In a tandem wing aircraft having a fuselage structure and lifting surfaces, the improvement comprising in combination: a lower forward wing having an aspect ratio greater than 8 and a higher aft wing having an aspect ratio greater than 8, each of said wings adapted to provide lift ranging from 40% to 60% of the combined total lift supporting said aircraft in flight, said wings producing said lift and providing normal aircraft pitch control without production of a downwardly acting load; said lower forward wing being located adjacent to and attached directly to said fuselage structure in its forward region; said higher aft wing being aerodynamically spaced apart from and located above said fuselage structure in its aft region; said aft wing being attached to said fuselage structure by at least one aft strut member having a length sufficient to cause the wing tips of said forward and aft wings to be vertically spaced apart by at least 25% of the span of said forward wing and at least 25% of the span of said aft wing, each of said wing tips being free of connection to any other of said wing tips.

2. The aircraft of claim 1 wherein there are two of said aft strut members attaching said aft wing to said fuselage structure.

3. The aircraft of claim 1 wherein said wings are longitudinally separated at their tips by a distance exceeding 40% of the length of said fuselage.

4. An aircraft according to claim 1 suitable for transonic flight wherein area-rule principles have been applied and the fuselage structure provides substantially the entire area in the region of maximum area of the desired Sears-Haack curve.

5. An aircraft according to claim 1 wherein in the central longitudinal region of the aircraft substantially all of the cross-sectional area of the aircraft is provided by fuselage structure, the wings being located forward and aft of said central longitudinal region.

6. The aircraft of claim 5 wherein the fuselage has a maximum area cross-section at said central longitudinal region and the fuselage cross-section decreases in area along the fuselage in both directions from said central region.

7. The aircraft of claim 1 wherein each of said wings is provided with at least twelve wing control surfaces.

* * * * *